US008340632B2

(12) United States Patent  (10) Patent No.: US 8,340,632 B2
Bernath  (45) Date of Patent: Dec. 25, 2012

(54) PREPAID CELLULAR PHONE NO-CHARGE TRANSACTION SYSTEM

(75) Inventor: Tracey Bernath, Leawood, KS (US)

(73) Assignee: Inceptia LLC, Brooklyn, NY (US)

( * ) Notice: Subject to any disclaimer, the term of this patent is extended or adjusted under 35 U.S.C. 154(b) by 774 days.

(21) Appl. No.: 11/567,900

(22) Filed: Dec. 7, 2006

(65) Prior Publication Data

US 2008/0139171 A1  Jun. 12, 2008

(51) Int. Cl.
*H04M 11/00* (2006.01)
*H04M 15/00* (2006.01)

(52) U.S. Cl. ........ 455/406; 455/405; 455/407; 455/408; 379/114.2

(58) Field of Classification Search .......... 455/405–408, 455/432; 379/114; 705/37
See application file for complete search history.

(56) References Cited

U.S. PATENT DOCUMENTS

| | | | |
|---|---|---|---|
| 5,722,067 A | 2/1998 | Fougnies et al. | |
| 5,828,740 A * | 10/1998 | Khuc et al. | 379/114.2 |
| 5,912,882 A | 6/1999 | Yafuso et al. | |
| 5,983,099 A | 11/1999 | Yao et al. | |
| 6,157,823 A | 12/2000 | Fougnies et al. | |
| 6,625,439 B2 | 9/2003 | Laybourn et al. | 455/407 |
| 6,816,721 B1 * | 11/2004 | Rudisill | 455/406 |
| 7,406,305 B2 * | 7/2008 | Laybourn et al. | 455/405 |
| 7,505,767 B2 * | 3/2009 | Zabawskyj et al. | 455/432.1 |
| 2003/0039242 A1 | 2/2003 | Moore | |
| 2003/0177245 A1 | 9/2003 | Hansen | |
| 2004/0009760 A1 * | 1/2004 | Laybourn et al. | 455/405 |
| 2004/0224710 A1 | 11/2004 | Koskelainen et al. | |
| 2004/0253941 A1 * | 12/2004 | Rivera et al. | 455/408 |
| 2005/0122923 A1 | 6/2005 | Jang et al. | |
| 2005/0232241 A1 | 10/2005 | Wu et al. | |
| 2005/0266859 A1 | 12/2005 | Tejani et al. | |
| 2006/0019655 A1 | 1/2006 | Peacock | |
| 2006/0019698 A1 | 1/2006 | Ahya et al. | |
| 2006/0023654 A1 | 2/2006 | Koren et al. | |
| 2006/0023747 A1 | 2/2006 | Koren et al. | |
| 2006/0026288 A1 | 2/2006 | Acharya et al. | |
| 2006/0030347 A1 | 2/2006 | Biswaas | |
| 2006/0046697 A1 | 3/2006 | Koren et al. | |
| 2006/0046756 A1 | 3/2006 | Kies | |
| 2006/0080344 A1 | 4/2006 | McKibben et al. | |
| 2006/0100951 A1 * | 5/2006 | Mylet et al. | 705/37 |
| 2006/0262914 A1 * | 11/2006 | Cai | 379/114.16 |
| 2008/0119161 A1 * | 5/2008 | Collart | 455/408 |

OTHER PUBLICATIONS

"Toward the all-IP Vision", Olsson, Ericsson—10 pgs.
"IP multimedia—a new era in communications", Nokia Connecting People 12 pgs.

(Continued)

*Primary Examiner* — Jinsong Hu
*Assistant Examiner* — William Nealon

(57) ABSTRACT

A no-charge transaction service method and apparatus for prepaid cellular telephones is provided which utilizes a prepaid cellular telephone in conjunction with a wireless intelligent network coupled to a prepaid cellular service provider. The user enters a short code to indicate a top-up request or other transaction request along with payment information into the prepaid cellular telephone using the alphanumeric keypad. The call data is transmitted to the wireless network which identifies the call and transfers the information to the prepaid cellular service provider. The prepaid cellular service provider identifies the transaction type, validates the call data and sends a verification message to the prepaid cellular telephone and other associated equipment, if any, via short message service, push to talk service, or other means without completing the originating call.

27 Claims, 3 Drawing Sheets

OTHER PUBLICATIONS

"IMS—Signalling & Control Enable New Classes of Services", Wermser et al., University of Applied Sciences Braunschweig/Wolfenbittel—12 pgs.

"IP Multimedia Subsystem (IMS) Service Architecture", Lucent Technologies—Bell Labs Innovations—Feb. 2005—12 pgs.

"IMS—IP Multimedia Subsystem: The value of using the IMS architecture", Ericcson, White Paper Oct. 2004, 27 pgs.

"Mobile Technologies and their Evolution", Ermanno Berruto, Wind Telecomunicazioni S.p.A. Oct. 7, 2005, 31 pgs.

* cited by examiner

PREPAID CELLULAR PHONE NO-CHARGE TRANSACTION SYSTEM

FIELD

The present invention is related to communications networks and, more particularly, to a method and apparatus for no-charge transaction services for prepaid cellular telephones.

BACKGROUND

In the past, switches or other elements of a communication (or telecommunication) network that route calls from one location to another, governed and provided special telecommunications services. Such switches or other elements are usually at least part of a "serving system" that provides service for multiple subscribers (typically in a given area). In a wireless intelligent network (WIN), each serving system includes a switch often referred to as a mobile switching center (MSC) as well as a signal transfer point (STP) and a service control point (SCP). STPs are the packet switches of the network which receive and route incoming signaling information towards the proper destination, and perform other routing functions. SCPs are databases that provide information necessary for advanced call-processing capabilities. The serving system also includes a home location register (HLR) that defines the services and features authorized for use by the subscriber.

A mobile subscriber communicates with the MSC through a base station, which provides an air interface for the mobile subscriber. The MSC connects to the HLR and the SCP through the signaling system 7 (SS7) and STP networks in order to access information about the subscriber. When a mobile subscriber operates in a given serving system, the serving system engages in signaling communication with the HLR in the subscriber's home system to notify the HLR where the subscriber is located and to obtain the subscriber's current profile. The serving system may also include a subscriber profile database referred to as a visitor location register (VLR), which stores a temporary copy of a subscriber's profile obtained from the HLR. The MSC may also access the VLR to obtain information about the subscriber.

For a prepaid cellular telephone, the subscriber has an account with a prepaid cellular phone company. The subscriber may use the cellular telephone as long as there are sufficient funds in his or her account. To add additional funds to or "top-up" his/her account, the subscriber must call a customer service number, typically an 800 number, and provide calling card or credit card information to the customer service representative. The cost for placing this call is paid by the prepaid cellular phone company and passed on to the subscriber. Thus the subscriber does not get the full benefit of the available funds for making phone calls. This can become a burdensome and an inefficient manner of providing top-up services. Additionally, if the subscriber wishes to purchase an item using the prepaid cellular phone, the subscriber is charged for the phone call.

SUMMARY

To facilitate topping-up a prepaid cellular phone account without incurring administrative costs associated with the call, the present invention provides a method and system for facilitating the top-up service of a prepaid cellular telephone plan. The method may be performed in a communications network in conjunction with a prepaid cellular phone service provider. When a cellular phone is initially turned on, it searches for a signal from a cellular tower. If more than one signal is found, typically the strongest signal is chosen and an available channel selected. On the reverse control path, the cellular phone identifies itself by sending its phone number, electronic serial number and home system identification (SID) number. If the home SID is not the SID of the receiving MSC, the MSC first checks to determine if the information is stored locally in the VLR. If there is no match, the information is routed through the signaling system 7 (SS7) network to the appropriate home system HLR. The HLR retrieves the account information and returns it to the requesting MSC which temporarily stores the information in the VLR.

In one aspect, the method includes dialing a predefined feature code followed by a sequence of numbers such as a prepaid card number, pin and phone number to be credited, from a prepaid cellular phone. The dialed feature code and sequence is received by the MSC. The MSC recognizes the call as originating from a prepaid cellular phone and retrieves the account information from the VLR. The MSC sends the dialed digits along with the account information to the SCP operated by the prepaid cellular phone company, through the SS7 and STP networks. The SCP and STP are customarily deployed in pairs. The individual SCPs and STPs are not generally co-located and work redundantly to perform the same functions.

The feature code and sequence of digits are parsed by the SCP to separate out the dialed numbers. Because this is a prepaid cellular phone, all account information is stored in the SCP or enhanced STP gateway. The SCP validates the card number and pin against a database containing valid card information and retrieves the stored value for the card. The SCP verifies that the phone to credit is a valid prepaid cellular phone and sends a text message utilizing short message service (SMS) or a voice message utilizing push-to-talk (PTT), for example, to the phone to confirm or cancel the transaction. If any of the information is not validated by the SCP, a call is placed directly to a problem-specific customer service representative with the prepaid cellular phone company to address the issue.

The present invention may be applied in various network arrangements where a prepaid cellular phone is utilized. These as well as other features and advantages will be come apparent to those of ordinary skill in the art by reading the following detailed description, with appropriate reference to the accompanying drawings.

DETAILED DESCRIPTION

Figure 1:
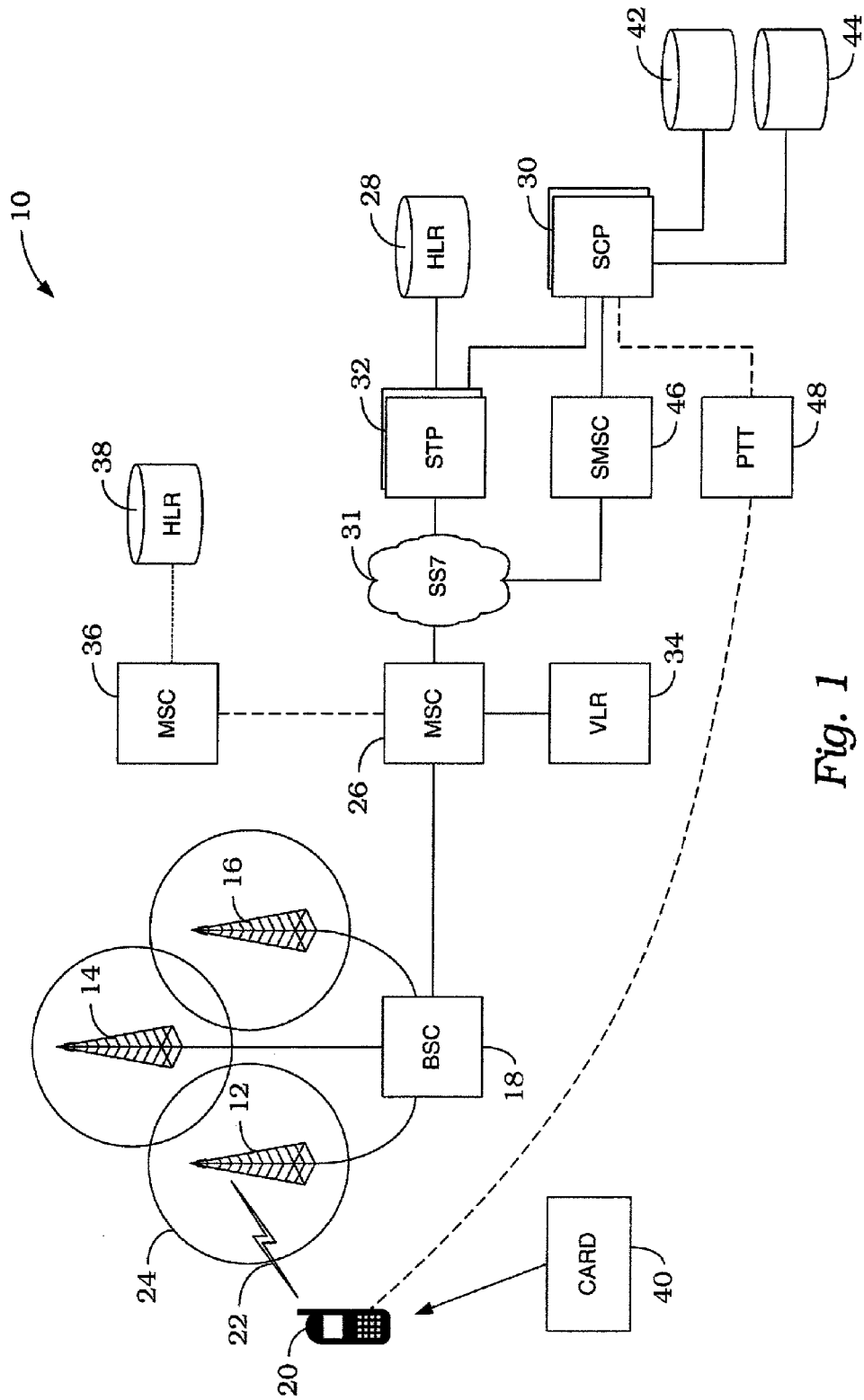
FIG. 1 is a functional block diagram of a top-up request of the prepaid wireless transaction service.
Figure 2:
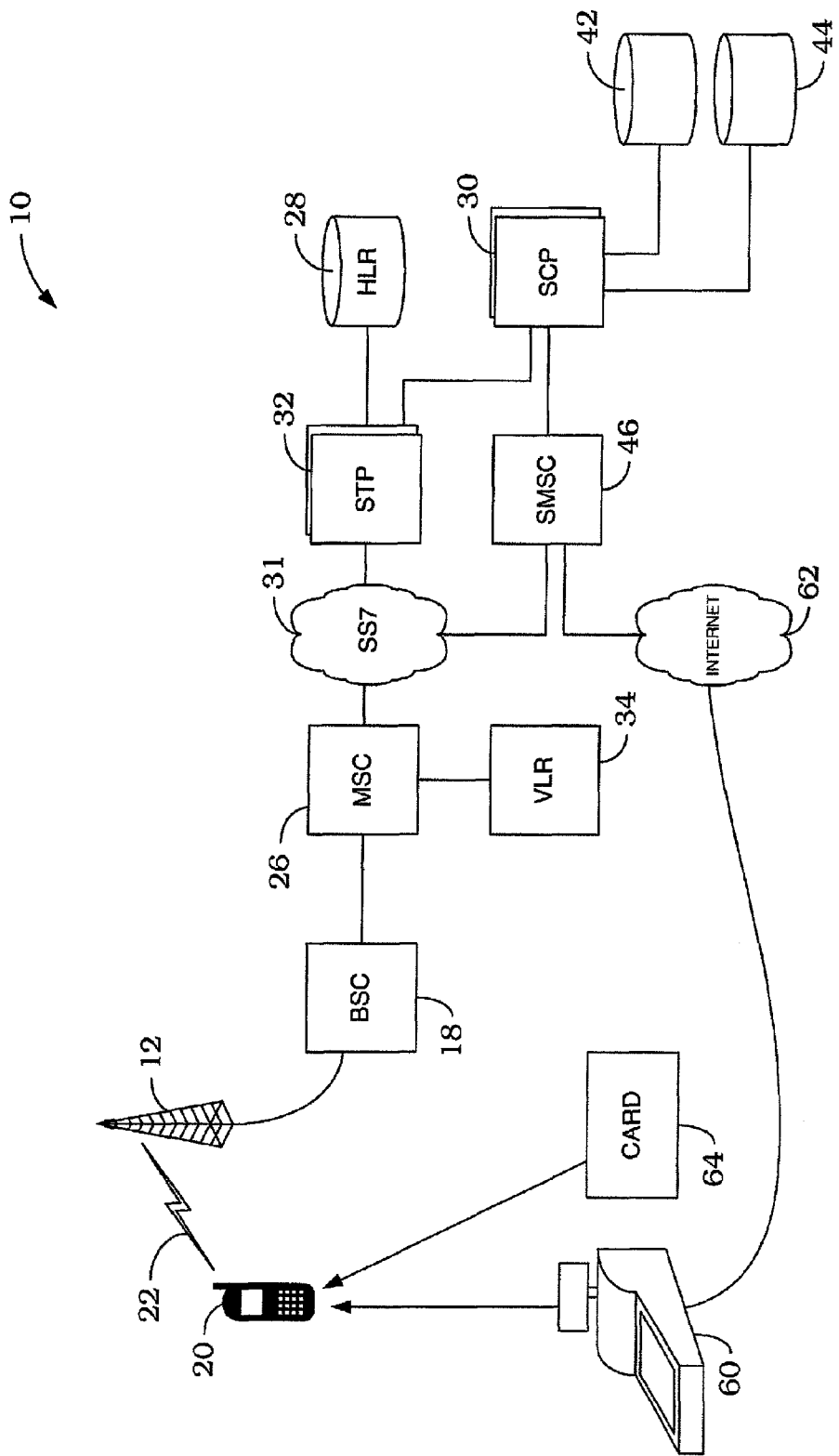
FIG. 2 is a functional block diagram of item purchase application of the prepaid wireless transaction service.
Figure 3:
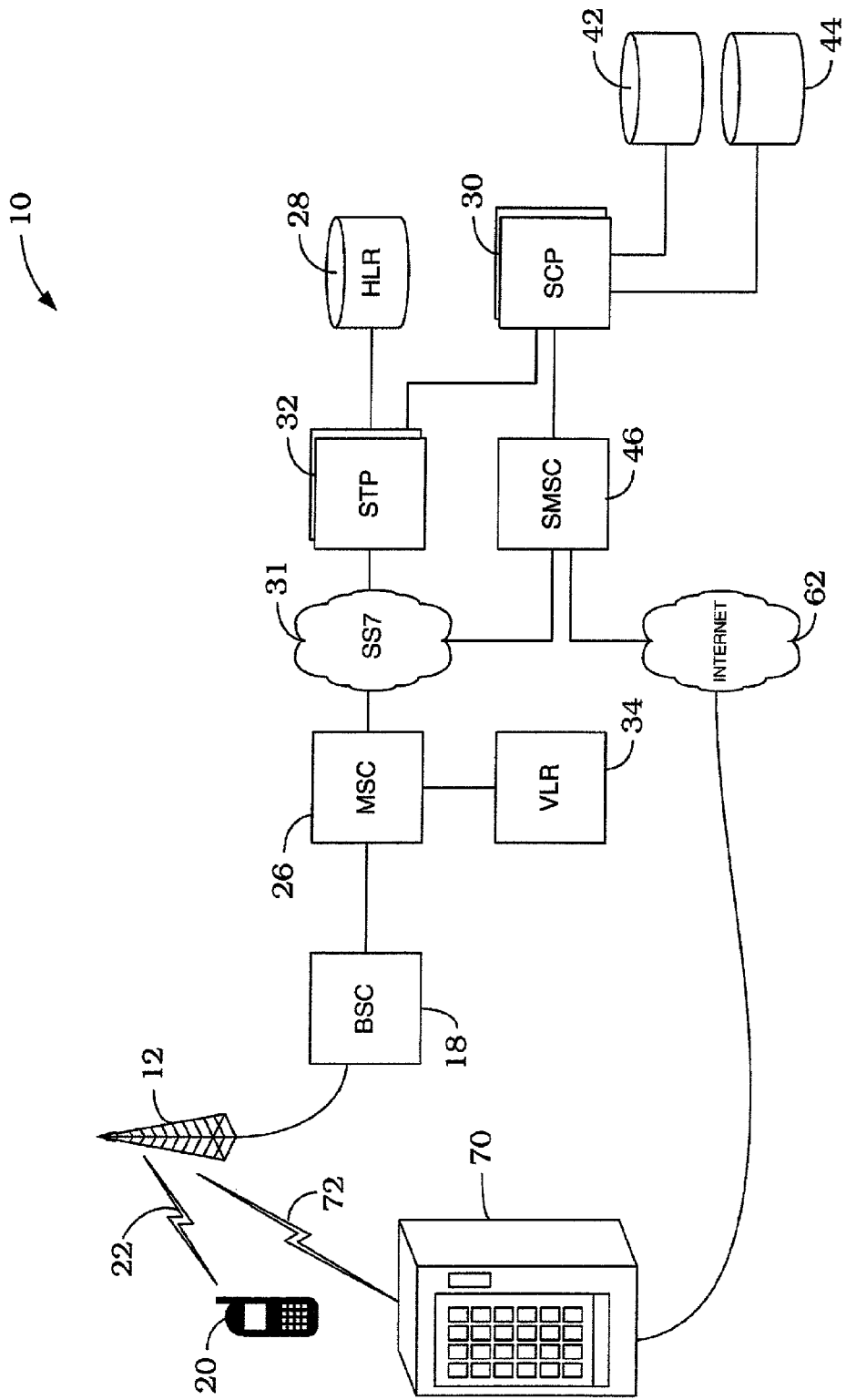
FIG. 3 is a simplified functional block diagram of a vending machine application of the prepaid wireless transaction service.

Referring to FIG. 1, a simplified block diagram of a wireless intelligent network (WIN) 10 in which an exemplary embodiment of the present invention may be employed is illustrated. As shown in FIG. 1, WIN 10 includes cellular towers 12, 14 and 16 each connected to a base station controller (BSC) 18. The cellular tower 12 can determine the direction of a cell phone 20 relative to the tower 12 as well as the distance from the tower by the power of the cell phone signal 22. The BSC 14 determines when a cell phone 20 is about to leave a cell 24 and notifies the mobile switching center (MSC) 26 as to the direction of travel of the cell phone 20. The MSC 26 sets up the next cell tower (tower 14 for example) through the associated BSC 18. The MSC 26 instructs the cell phone 20, through the BSC 18 and cellular tower 12, to change frequency which is then picked up by the new cellular tower 14.

In a WIN 10, a mobile subscriber communicates by activating a cell phone 20. The cell phone 20 broadcasts a signal 22 which is received by a cellular tower 12. The cellular tower 12 sends the received signal to the BCS 18 which routes the information to the MSC 26. The MSC 26 connects to a home location register (HLR) database 28 and a service control point (SCP) 30 through the signaling system 7 (SS7) network 31 and a signaling transfer point (STP) 32 network in order to access information about the subscriber. The HLR database 28 defines the services and features authorized for use by the subscriber. When a cell phone 20 is roaming, the MSC 26 receives the cellular phone identification information and thus classifies the phone as a roaming phone since the phone is not included in its HLR database 28. The MSC 26 communicates with the home MSC 36 of the roaming phone through the WIN 10, authenticates the phone usage, and updates the HLR database 38 at the home location with the new location information for the roaming cellular phone. The MSC 26 registers the roaming phone identification information temporarily in its visitor location register (VLR) 34.

In an exemplary prepaid cellular transaction system, a user with a prepaid cellular phone 20 purchases a phone card 40 from a reseller, for example. The card 40 includes an activation number and a pin under a scratch-off label. The user dials a short code such as "##" followed by the card number and pin, and presses the send button on the cellular phone 20. The short code and digits are transmitted 22 to cell tower 12. The information is received by the BSC 18 and sent to the MSC 26. The MSC 26 recognizes the call as originating from a prepaid phone and retrieves the account information corresponding to the cellular phone 20 from the VLR 34. The MSC 26 then routes the call through the SS7 network 31 to the STP 32. The STP 32 forwards the dialed digits and account information to the SCP 30 which is operated by a prepaid cellular company identified by the phone.

The SCP 30 is programmed to recognize the short code ("##") as a top-up request. The dialed digits are parsed by the SCP 30 to separate out the card number, pin and cellular phone identifying information. Because this is a prepaid phone 20, all account information is stored in the SCP 30. The SCP 30 validates the card number and pin against a database 42 containing valid card data and retrieves the stored value for the card. The SCP 30 verifies that the cellular phone is a valid prepaid phone from an accounts database 44. The SCP 30 sends a text or SMS message to the cellular phone 20 to confirm or cancel the transaction via a Short Message Service Center (SMSC) 46 or Push to Talk (PTT) 48.

An SMS is a wireless service that enables the transmission of alphanumeric messages between mobile subscribers and external systems such as email, voice mail systems and paging. Point-to-point SMS provides a mechanism for transmitting short messages to and from wireless handsets. The SMSC 46 acts as a store-and-forward system for short messages and is responsible for relaying a short message from the SCP 30 (or other short messaging entity) to the wireless handset. The wireless network including SS7 31 and MSC 26 provide the transport of short messages between the SMSC 46 and handset 20.

PTT is a feature that is available on some mobile phone models which allows the mobile phone, when in a special mode, to function as a digital two-way radio in push-to-talk operation. Only one person at a time can talk, by pressing a PTT button on the mobile phone, and one or several others can listen instantly. The service connects mobile phone users with each other within seconds. Currently, PTT users have to belong to the same mobile operator's (service provider's or carrier's) network in order to talk to one another. The evolution of the standards will make such interconnection possible in the near future. The PTT service commonly does not use up the regular airtime minutes that are used for general voice calls.

In accordance with the SS7 protocol, because the originating call was never completed through the network, the call is not charged against the service provider and consequently the call is not charged against the prepaid phone account.

If the SCP 30 is unable to validate the card number or pin, the SCP 30 may send a SMS message to the cellular phone to reenter the card number or pin. If the SCP 30 is unable to validate the card number or pin a second time, the SCP 30 may initiate a toll-free call to connect the user to a customer service representative. The SCP 30 may include problem specific phone numbers to immediately and specifically address the error detected by the SCP and thereby shorten the call time necessary to address the problem.

In a similar example of a prepaid cellular transaction system, a user with a prepaid cellular phone 20 purchases a phone card 40 from a reseller. The card 40 includes an activation number and a pin under a scratch-off label. The user dials a short code such as followed by the card number, pin and a phone-to-credit number, and presses the send button on the cellular phone 20. The short code and digits are transmitted 22 to cell tower 12. The information is received by the BSC 18 and sent to the MSC 26. The MSC 26 recognizes the call as originating from a prepaid phone and retrieves the account information corresponding to the cellular phone 20 from the VLR 34. The MSC 26 then routes the call through the SS7 network 31 to the STP 32. The STP 32 forwards the dialed digits and account information to the SCP 30 which is operated by a prepaid cellular company identified by the phone.

The SCP 30 is programmed to recognize the short code ("##") as a top-up request. The dialed digits are parsed by the SCP 30 to separate out the card number, pin, phone-to-credit number and cellular phone identifying information. Because this is a prepaid phone 20, all account information is stored in the SCP 30. The SCP 30 validates the card number and pin against the database 42 containing valid card data and retrieves the stored value for the card. The SCP 30 verifies that the phone-to-credit number and cellular phone are valid prepaid phone numbers from the accounts database 44. The SCP 30 sends a text or SMS message to the cellular phone 20 to confirm or cancel the transaction via a Short Message Service Center (SMSC) 46 or Push to Talk (PTT) 48. Additionally, the SCP 30 may send a text or SMS message to the phone-to-credit (not shown) via the SMSC 46 or PTT 48.

In another example of a prepaid cellular transaction system, a user with a prepaid cellular phone 20 wishes to purchase an item from a merchant. The item is scanned and the price is displayed on a cash register 60. The cash register 60 is typically connected to a network or internet 62 to receive credit card information and approval. Cash register 60 also includes a unique identifying number which is displayed for use by the user. The user dials a short code such as "**" followed by a credit card number 64, the cash register number, and the purchase price of the item, and presses the send button on the cellular phone 20.

The short code and digits are transmitted 22 to cell tower 12. The information is received by the BSC 18 and sent to the MSC 26. The MSC 26 recognizes the call as originating from a prepaid phone and retrieves the account information corresponding to the cellular phone 20 from the VLR 34. The MSC 26 then routes the call through the SS7 network 31 to the STP 32. The STP 32 forwards the dialed digits and account information to the SCP 30 which is operated by a prepaid cellular company identified by the phone.

The SCP 30 is programmed to recognize the short code ("**\*\*") as a purchase request. The dialed digits are parsed by the SCP 30 to separate out the card number, the cash register number and amount, and cellular phone identifying information. Because this is a prepaid phone 20, all account information is stored in the SCP 30. The SCP 30 validates the credit card number through a known method. The SCP 30 verifies that the phone is a valid prepaid phone from the accounts database 44. The SCP 30 sends a text or SMS message to the cellular phone 20 to confirm or cancel the transaction via the SMSC 46** or PTT (not shown).

If the user confirms the purchase via a return SMS message to the SCP 30, the SCP 30 sends a SMS message to the cash register 60 to confirm or cancel the transaction via the SMSC 46 through the internet 62. Once the transaction is confirmed, the credit card is charged and a receipt is printed from the cash register 60. In accordance with the SS7 protocol, because the originating call was never completed through the network, the purchase call is not charged against the prepaid phone account.

It should be understood that the user may enter a credit card number, debit card number, or simply a PIN corresponding to the user's prepaid cellular phone account to purchase the item. The cash register 60 may be wirelessly enabled, connected to a local area network, or otherwise able to receive a message from the SCP 30 to complete the transaction. For a purchase request, the user may also enter the prepaid telephone number and PIN to pay for the item directly from the user's prepaid cellular phone account or from a credit card associated with the user's account.

As another example of a prepaid cellular transaction system, a user may purchase an item from a network enabled vending machine 70. The vending machine 70 includes a unique identifier so that it may be addressed by the WIN. A user with a prepaid cellular phone wishing to purchase a item from the vending machine 70 dials a short code such as "**\*\*" followed by a vending machine number, the item number, item amount, and a credit card number, and presses the send button on the cellular phone 20. The short code and digits are transmitted 22 to cell tower 12. The information is received by the BSC 18 and sent to the MSC 26. The MSC 26 recognizes the call as originating from a prepaid phone and retrieves the account information corresponding to the cellular phone 20 from the VLR 34. The MSC 26 then routes the call through the SS7 network 31 to the STP 32. The STP 32 forwards the dialed digits and account information to the SCP 30** which is operated by a prepaid cellular company identified by the phone.

The SCP 30 is programmed to recognize the short code ("**\*\*") as a purchase request. The dialed digits are parsed by the SCP 30 to separate out the vending machine number, item number, item amount, card number and prepaid cellular phone identifying information. Because this is a prepaid phone 20, all account information is stored in the SCP 30. The SCP 30 validates the credit card number through a known method. The SCP 30 verifies that the phone is a valid prepaid phone from the accounts database 44. The SCP 30 sends a text or SMS message to the cellular phone 20 to confirm or cancel the transaction via the SMSC 46** or PTT (not shown).

If the user confirms the purchase via a return SMS message to the SCP 30, the SCP 30 sends a SMS message to the vending machine 70 to confirm or cancel the transaction via the SMSC 46 through the internet 62 or wirelessly 72. Once the transaction is confirmed, the credit card is charged and the selected item is dispensed from the vending machine. In accordance with the SS7 protocol, because the originating call was never completed through the network, the purchase call is not charged against the prepaid phone account. It should be understood that the user may enter a credit card number, debit card number, or simply a PIN corresponding to the user's prepaid cellular phone account to purchase the item.

It should be understood that the short code entered may be any short code defined by the prepaid cellular telephone company to identify a top-up request or purchase request. For example, the short code could be "011##" or "011" followed by a sixteen digit credit card number and four digit expiration date. Longer codes could also be used. However, it is advantageous to use a short code to reduce the number of digits necessary to be entered and to allow more flexibility in the system.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is as follows:

1. A no-charge transaction system for use with a prepaid cellular telephone, wherein said prepaid cellular telephone includes a conventional cellular telephone instrument with a voice communications means and a digital input means in the form of an array of alphanumeric keys for providing call data, said call data including transaction request data to identify a transaction, said no-charge transaction system comprising:
    a prepaid cellular telephone service provider for providing cellular telephone service to said prepaid cellular telephone, and
    a wireless network coupled to said prepaid cellular telephone service provider and for presenting voice and call data developed by said prepaid cellular telephone, said wireless network for receiving call data generated by said prepaid cellular telephone, identifying said prepaid cellular telephone service provider corresponding to said prepaid cellular telephone and transferring said call data to said prepaid cellular telephone service provider, wherein the call data corresponds to digits dialed with said prepaid cellular telephone for originating a call,
    said prepaid cellular telephone service provider including means for receiving said call data, means for identifying said transaction request data and means for validating said call data against a user account corresponding to said prepaid cellular telephone,
    said prepaid cellular telephone service provider generating message data upon validation of said call data and transmitting said message data to said prepaid cellular telephone to verify identification of said transaction request data and to verify validation of said call data.

2. The no-charge transaction system as set forth in claim 1 wherein said transaction request data includes a short code.

3. The no-charge transaction system as set forth in claim 1 wherein said transaction request data includes phone card data.

4. The no-charge transaction system as set forth in claim 3 wherein said phone card data includes a phone card number and PIN, and wherein said prepaid cellular telephone service provider further provides identification of a phone card value corresponding to said phone card number and PIN, and crediting said phone card value to said user account.

5. The no-charge transaction system as set forth in claim 1 wherein said transaction request data includes phone to credit data.

6. The no-charge transaction system as set forth in claim 1 wherein said transaction request data includes credit card number data.

7. The no-charge transaction system as set forth in claim 1 wherein said transaction request data includes a monetary value.

8. The no-charge transaction system as set forth in claim 1 wherein said transaction request data includes register data and a transaction amount.

9. The no-charge transaction system as set forth in claim 8 further comprising confirmation data sent to a register corresponding to said register data to complete said transaction, and wherein said transaction amount is debited from said user account and transferred to a merchant identified by said register data.

10. The no-charge transaction system as set forth in claim 1 wherein said message data is transmitted to said wireless network for delivery to said prepaid cellular telephone via short message service.

11. The no-charge transaction system as set forth in claim 1 wherein said message data is transmitted to said prepaid cellular telephone via push to talk service.

12. In combination with a wireless cellular telephone network, a no-charge transaction system for use with a prepaid cellular telephone comprising:
    a prepaid cellular telephone having an array of alphanumeric keys for providing call data, said call data including service provider data and transaction request data, and
    a service provider for providing cellular telephone service to said prepaid cellular telephone,
    said wireless network coupled to said service provider and receiving call data generated by said prepaid cellular telephone, identifying said service provider corresponding to said service provider data and transferring said call data to said service provider, wherein the call data corresponds to digits dialed with said prepaid cellular telephone for originating a call,
    said service provider including means for receiving said call data, means for identifying said transaction request data and means for validating said call data,
    said service provider generating message data upon validation of said call data and transmitting said message data to said wireless network for delivery to said prepaid cellular telephone to verify identification of said transaction request data and to verify validation of said call data.

13. The no-charge transaction system as set forth in claim 12 wherein said call data includes a phone card number and PIN, and wherein said prepaid cellular telephone service provider further provides identification of a phone card value corresponding to said phone card number and PIN, and crediting said phone card value to a user account corresponding to said prepaid cellular telephone.

14. The no-charge transaction system as set forth in claim 12 wherein said transaction request data includes phone to credit data and an amount, wherein a user account associated with said phone to credit data is credited said amount.

15. The no-charge transaction system as set forth in claim 12 wherein said transaction request data includes register data and a transaction amount and said system further comprises confirmation data sent to a register corresponding to said register data to complete said transaction, and wherein said transaction amount is debited from said user account and transferred to a merchant identified by said register data.

16. In combination with a wireless cellular telephone network, a method for providing a no-charge transaction system for use with a prepaid cellular telephone including:
    a) entering call data into a prepaid cellular telephone by actuating an array of alphanumeric keys on said prepaid cellular telephone, said call data including service provider data and transaction request data,
    b) transmitting said call data to a wireless network, wherein the call data corresponds to digits dialed with said prepaid cellular telephone for originating a call,
    c) receiving said call data by said wireless network and identifying a service provider from said service provider data,
    d) transferring said call data to said service provider,
    e) receiving said call data by said service provider, identifying said transaction request data, and validating said call data,
    f) upon validation of said call data, transmitting message data to said wireless network for delivery to said prepaid cellular telephone,
    g) receiving said message data by said wireless network and transferring said message data to said prepaid cellular telephone, and
    h) receiving said message data by said prepaid cellular telephone to acknowledge validation of said call data sent by said prepaid cellular telephone.

17. The no-charge transaction system method as set forth in claim 16 wherein said transaction request data includes phone card data including a phone card number and PIN, and wherein said step e) further includes identifying a phone card value corresponding to said phone card number and PIN, and crediting said phone card value to a user account corresponding to said prepaid cellular telephone.

18. The no-charge transaction system method as set forth in claim 16 wherein said transaction request data includes phone to credit data and an amount, and wherein said step e) includes crediting said account to a user account associated with said phone to credit data.

19. The no-charge transaction system method as set forth in claim 16 wherein said transaction request data includes register data and a transaction amount and the method further includes the steps of:
    i) sending confirmation data from said service provider to a register corresponding to said register data to complete said transaction,
    j) debiting said transaction amount by said service provider from said user account, and
    k) transferring said transaction amount to a merchant identified by said register data.

20. The no-charge transaction system method as set forth in claim 16 wherein said message data is transmitted to said wireless network for delivery to said prepaid cellular telephone via short message service.

21. The no-charge transaction system method as set forth In claim 16 wherein said message data is transmitted to said prepaid cellular telephone via push to talk service.

22. A method for a service provider to provide a no-charge transaction fee for increasing the time credits available on a prepaid cellular telephone having service provider data and user account data programmed therein comprising the steps of:

a) issuing transaction request data by a service provider to a user of a prepaid cellular telephone, said transaction request data including a processing code and a credit amount code;
b) instructing said user to enter and to transmit said transaction request data along with said user account data and said service provider data as call data through the prepaid cellular telephone across a cellular telephone network; said service provider data selected to cause a server on said cellular telephone network to route said call data to said service provider, wherein the call data corresponds to digits dialed by the user with said prepaid cellular telephone for originating a call;
c) receiving by said service provider said call data transmitted by said user from said prepaid cellular telephone across the cellular telephone network; said processing code being recognized by said service provider and causing said server to route said call data to said service provider without charging an account associated with the user account data for a completed call;
d) validating said call data,
e) increasing a credit balance stored in the account associated with the user account data by an amount associated with said credit amount code;
f) transmitting message data to the prepaid cellular telephone, and
g) receiving said message data by said prepaid cellular telephone to acknowledge adding the amount associated with said credit amount code to the credit balance in the account associated with the user account data.

23. The method as set forth in claim 22 wherein said transaction request data includes phone card data which includes a phone card number and PIN, and wherein said prepaid cellular telephone service provider further provides identification of a phone card value corresponding to said phone card number and PIN, and crediting said phone card value to a user account corresponding to said prepaid cellular telephone.

24. The method as set forth in claim 22 wherein said transaction request data includes phone to credit data and an amount, wherein a user account associated with said phone to credit data is credited said amount.

25. The method as set forth in claim 22 wherein said transaction request data includes register data and a transaction amount and said method further includes the steps of sending confirmation data to a register corresponding to said register data to complete said transaction, and wherein said transaction amount is debited from said user account and transferred to a merchant identified by said register data.

26. A method for validating transaction request data transmitted with a cellular telephone comprising the steps of:
a) receiving in a wireless network call data developed by the cellular telephone, said call data corresponding to digits dialed by a user with the cellular telephone for originating a call and wherein the call data includes transaction request data;
b) identifying account information corresponding to said cellular telephone;
c) identifying a service provider system corresponding to said cellular telephone, wherein the service provider system is coupled to said wireless network;
d) transferring said call data to said service provider system; and
e) verifying by said service provider system said transaction request data.

27. The method of claim 26 further comprising:
in response to verifying by the service provider system said transaction request data;
transmitting by the service provider system message data to the cellular telephone, wherein the message data includes an acknowledgment of verification of the transaction request data.

* * * * *